US011383865B2

(12) United States Patent
Bacellar et al.

(10) Patent No.: US 11,383,865 B2
(45) Date of Patent: Jul. 12, 2022

(54) FOOD CONVEYOR AND PACKAGING SYSTEMS AND METHODS

(71) Applicant: Intercontinental Great Brands LLC, East Hanover, NJ (US)

(72) Inventors: Ricardo Bacellar, Sao Paulo (BR); Joao Moreira, Sao Paulo (BR)

(73) Assignee: Intercontinental Great Brands LLC, East Hanover, NJ (US)

(*) Notice: Subject to any disclaimer, the term of this patent is extended or adjusted under 35 U.S.C. 154(b) by 155 days.

(21) Appl. No.: 16/986,073

(22) Filed: Aug. 5, 2020

(65) Prior Publication Data

US 2020/0361646 A1  Nov. 19, 2020

Related U.S. Application Data

(63) Continuation of application No. 15/747,745, filed as application No. PCT/US2016/045743 on Aug. 5, 2016, now Pat. No. 10,766,645.

(60) Provisional application No. 62/205,458, filed on Aug. 14, 2015.

(51) Int. Cl.
| B65B 23/14 | (2006.01) |
| B65B 35/30 | (2006.01) |
| B65B 23/12 | (2006.01) |
| B65B 35/40 | (2006.01) |
| B65G 47/90 | (2006.01) |
| B65B 9/06 | (2012.01) |
| B25J 9/00 | (2006.01) |
| B65G 47/04 | (2006.01) |

(52) U.S. Cl.
CPC .............. *B65B 23/14* (2013.01); *B65B 23/12* (2013.01); *B65B 35/405* (2013.01); *B65G 47/90* (2013.01); *B25J 9/0093* (2013.01); *B65B 9/06* (2013.01); *B65B 2220/16* (2013.01); *B65G 47/04* (2013.01)

(58) Field of Classification Search
CPC ......... B65B 23/14; B65B 35/30; B65G 47/06; B65G 47/90
USPC .............................. 53/447, 476, 54, 147, 531
See application file for complete search history.

(56) References Cited

U.S. PATENT DOCUMENTS

| 3,119,213 A | * | 1/1964 | Kinney | .................. B65B 35/50 53/448 |
| 3,593,837 A | | 7/1971 | Loomis, Jr. | |
| 3,675,792 A | | 7/1972 | Griner | |

(Continued)

FOREIGN PATENT DOCUMENTS

| EP | 0312490 | 4/1989 |
| GB | 1034382 | 6/1966 |

OTHER PUBLICATIONS

Examination Report in corresponding European Application No. 16751127.8, dated Jan. 29, 2019 (4 pgs.).

(Continued)

*Primary Examiner* — Gloria R Weeks
(74) *Attorney, Agent, or Firm* — Fitch, Even, Tabin & Flannery LLP

(57) ABSTRACT

A conveyor and packaging system includes an upstream conveyor that transports stacks biscuits in a plurality of lanes into buckets of a bucket conveyor. The bucket conveyor transports the buckets in a direction perpendicular to the length of the buckets to a packaging area, where transfer devices transfer the biscuit stacks to an input of a packaging machine. The transfer device can transfer the stacks without use of an intermediary conveyor.

8 Claims, 15 Drawing Sheets

(56) References Cited

U.S. PATENT DOCUMENTS

| | | | | |
|---|---|---|---|---|
| 3,743,118 | A | 7/1973 | Fluck | |
| 4,085,563 | A * | 4/1978 | Egee | B65B 35/44 53/493 |
| 4,092,392 | A * | 5/1978 | Dunbeker | B65D 1/16 425/525 |
| 4,114,349 | A * | 9/1978 | Jensen | B65B 57/14 53/493 |
| 4,161,094 | A | 7/1979 | Bardenhagen | |
| 4,314,785 | A * | 2/1982 | LaFleur, Jr. | B65H 29/42 414/795.1 |
| 4,373,320 | A * | 2/1983 | Olivierse | B65G 47/54 53/589 |
| 4,478,372 | A | 10/1984 | Paterson | |
| 4,680,919 | A | 7/1987 | Hirama | |
| 4,805,382 | A * | 2/1989 | DePasquale | B43M 5/042 53/284.3 |
| 5,170,877 | A | 12/1992 | Francioni | |
| 5,256,029 | A * | 10/1993 | Fluck | B65B 23/14 414/792.9 |
| 5,435,430 | A | 7/1995 | Stiener | |
| 5,454,212 | A * | 10/1995 | Tanaka | B65B 5/10 53/445 |
| 5,524,414 | A * | 6/1996 | Spada | B65B 19/32 209/535 |
| 6,122,895 | A * | 9/2000 | Schubert | B25J 9/026 53/251 |
| 6,374,984 | B1 | 4/2002 | Nagler | |
| 6,438,925 | B1 * | 8/2002 | Straub | B65B 5/108 53/244 |
| 6,619,017 | B2 * | 9/2003 | Franzaroli | B65B 25/146 53/147 |
| 6,688,451 | B2 | 2/2004 | Derby | |
| 6,779,647 | B1 | 8/2004 | Nagler | |
| 6,799,411 | B2 * | 10/2004 | Gasser | B65B 23/16 414/793 |
| 6,901,726 | B2 | 6/2005 | Hueppi | |
| 7,240,465 | B2 | 7/2007 | Davi | |
| 7,856,797 | B2 * | 12/2010 | Black | B65B 35/44 53/247 |
| 8,015,778 | B2 | 9/2011 | Tischhauser | |
| 8,191,890 | B2 * | 6/2012 | Franzone | B65H 3/66 271/149 |
| 8,407,973 | B2 * | 4/2013 | Finkowski | B65B 35/52 53/247 |
| 8,672,117 | B2 | 3/2014 | Stahl | |
| 8,689,530 | B2 | 4/2014 | Prahm | |
| 8,931,240 | B2 | 1/2015 | Lindee | |
| 9,038,354 | B2 * | 5/2015 | Davi | B65G 17/12 53/142 |
| 9,187,264 | B2 | 11/2015 | Gaudette | |
| 9,457,964 | B2 | 10/2016 | Schaumburg | |
| 9,856,092 | B2 * | 1/2018 | Job | B65G 43/08 |
| 10,017,285 | B2 * | 7/2018 | Boudreau | B65B 35/36 |
| 2001/0049923 | A1 | 12/2001 | Huppi | |
| 2005/0166552 | A1 | 8/2005 | Omo | |
| 2005/0241494 | A1 | 11/2005 | Davi | |
| 2005/0262802 | A1 | 12/2005 | Natterer | |
| 2006/0070353 | A1 | 4/2006 | Van Dam | |
| 2008/0131253 | A1 | 6/2008 | Scott | |
| 2009/0012644 | A1 | 1/2009 | Stifter | |
| 2010/0101191 | A1 | 4/2010 | Lindee | |
| 2010/0199599 | A1 | 8/2010 | Bonnain | |
| 2011/0023417 | A1 | 2/2011 | Finkowski | |
| 2013/0004289 | A1 | 1/2013 | Gaudette | |
| 2014/0260113 | A1 * | 9/2014 | Thompson | B25J 15/0061 53/247 |
| 2014/0290180 | A1 * | 10/2014 | Olbrich | B65B 19/02 53/411 |
| 2015/0158611 | A1 | 6/2015 | Kalany | |
| 2015/0191261 | A1 | 7/2015 | Clark | |
| 2016/0039550 | A1 | 2/2016 | Boudreau | |
| 2018/0222612 | A1 | 8/2018 | Bacellar | |
| 2018/0319522 | A1 | 11/2018 | Brolli | |

OTHER PUBLICATIONS

International Search Report and Written Opinion of the International Searching Authority, dated Oct. 12, 2017 for PCT/IB2017/001009 (9 pgs.).

Notification Concerning Transmittal of International Preliminary Report on Patentability, dated Mar. 1, 2018 for PCT/US2016/045743 (7 pgs.).

Notification of the First Office Action in Chinese Application No. 201680046301.5 dated Jun. 3, 2019 (12 pgs.).

* cited by examiner

FOOD CONVEYOR AND PACKAGING SYSTEMS AND METHODS

CROSS-REFERENCE TO RELATED APPLICATION

This application a continuation of U.S. application Ser. No. 15/747,745, filed Jan. 25, 2018, which is a U.S. national phase entry of International Application No. PCT/US2016/045743, filed Aug. 5, 2016, which claims the benefit of U.S. Provisional Application No. 62/205,458, filed Aug. 14, 2015, which are incorporated herein by reference in their entirety.

TECHNICAL FIELD

The present disclosure generally relates to systems and methods for handling and packaging food products. More specifically, the present disclosure relates to systems and methods for handling baked food products between baking and packaging stations.

BACKGROUND

Baked food products formed in mass production processes can be transferred from the baking ovens to packaging stations via conveyors. In one such process, baked biscuit products (e.g., biscuits, cookies, crackers, cakes, etc.) are baked in an oven and then transported or moved to one of a series of independent conveyor lanes.

FIG. 1 presents an example layout of a system 10 for such a process. As shown in FIG. 1, an output of the oven 20 leads to a series of multiple conveyors 40$n$, each of which conveyors 40$n$ can have multiple lanes. Each of the independent conveyors 40$n$ leads to a corresponding dedicated packaging machine 50$n$. Thus, in operation, the independent conveyors 40$n$ receive biscuits from the oven 20, and direct a single file stream of biscuits in the lanes to a corresponding packaging machine 50$n$.

Such an arrangement has several shortcomings. For example, if one packaging machine is inoperable, even for a brief period of time, all of the lanes on the conveyor dedicated to that machine will stop. This can result in inefficiencies because otherwise operable conveyors will go unused. Further, because each packaging machine utilizes its own separate conveyor, the layout for such an arrangement takes up a significant amount of space. For example, the arrangement of FIG. 1 can occupy 950 m$^2$ or more of floor space in a packaging facility.

Additionally, because the layout of FIG. 1 includes many conveyors spaced over a large area, each conveyor will require its own set of manual workers to attend to issues that arise on the production line. For instance, workers will need to tend to matters such as inspecting products, removing broken or improperly placed products, and addressing equipment breakdowns. Thus, the worker headcount to operate this system can be significantly high, which can make the process expensive.

For at least these reasons, multi-conveyor packaging systems such as those depicted in FIG. 1 can be can be inconvenient, inefficient, and expensive to operate.

SUMMARY

The present disclosure presents examples of a food product conveyor and packaging system. In one example, a system includes an upstream conveyor that transports food products. The upstream conveyor has an end portion that transports stacks of food products in a plurality of lanes. The system also includes a bucket conveyor that transports an array of buckets in a direction perpendicular to the lanes of the end portion of the upstream conveyor. The buckets are shaped to hold stacks of the food products. The exemplary system also includes a feeding station that feeds the stacks of food products from the lanes of the second portion of the upstream conveyor into the buckets of the bucket conveyor. The system also includes a transfer device that selectively transfers individual stacks of food products from the buckets to a packaging machine. The transfer device can transfer the stacks without use of an intermediary conveyor. For example, the transfer device can include one or more robotic arms that grab the stacks from the buckets and move them to the packaging machine.

The present disclosure also describes methods of conveying and packaging food products. In one example, a method involves conveying stacked food products along a plurality of lanes on an upstream conveyor. The exemplary method feeds the stacked food products into buckets on a second conveyor. The buckets are fed so that each lane of the upstream conveyor feeds into a separate bucket, and so that the individual buckets holding individual stacks of food products. The stacks of food products are then moved along the second conveyor in a direction perpendicular to the lanes of the upstream conveyor. In this way the buckets, or stacks of food products travel in a direction perpendicular to the length of the stacks. The method also includes transferring individual stacks of food products from the second conveyor to an input of a packaging machine using at least one robotic arm. The individual stacks of food products are packaged by the packaging machine.

In one example of operation, food products, such as biscuits, crackers, cookies, and the like are baked in an oven and transferred to a receiving end of an upstream conveyor. The food products may be arranged on the conveyor in a flat, non-overlapping manner.

In some examples, during transport along the upstream conveyor the food products can be inspected for problems such as breakage or other damage. The upstream conveyor channels the food products into lanes, and begins to arrange the products into stacks. For example, the upstream conveyor can employ penny stacker features that turns the flat products on edge and stacks them up against each other in the individual lanes.

In some examples the upstream conveyor then transports the products around a 90 degree turn so that they are traveling generally perpendicular to the receiving end of the upstream conveyor. The upstream conveyor then slopes downward toward the bucket conveyor, allowing gravity to facilitate transfer of the biscuit stacks between the lanes of the upstream conveyors and the buckets of the bucket conveyor. A feeding station, which may include a feeding device, such as a robotic volumetric feeder, may also ease with this transition to help assure that the food products do not break or become unstacked during the transfer process. The feeding device helps assure that stacks from the lanes of the upstream conveyor are placed into individual buckets in the bucket conveyor.

The buckets containing the individual stacks can then be transported in a direction perpendicular to the arrangement of the stacks along the bucket conveyor. As the buckets travel along the bucket conveyor, the sloped portion of the conveyor levels off to horizontal.

The buckets then approach a series of transfer devices that can selectively transfer the stacks from the bucket conveyor to the packaging machines. For example, the transfer devices can be robotic arms that grab the stacks and remove them from the buckets, and place them in the input of the packaging machines.

The packaging machines can then package the stacks, for example, by applying a flow-wrap packaging around the stacks, and transfer the packaged products to another conveyor. At this point the conveyor may further transport the packaged products to a second packaging station, where a second packaging (e.g., an outer packaging or box) can be applied.

DETAILED DESCRIPTION

Figure 1:
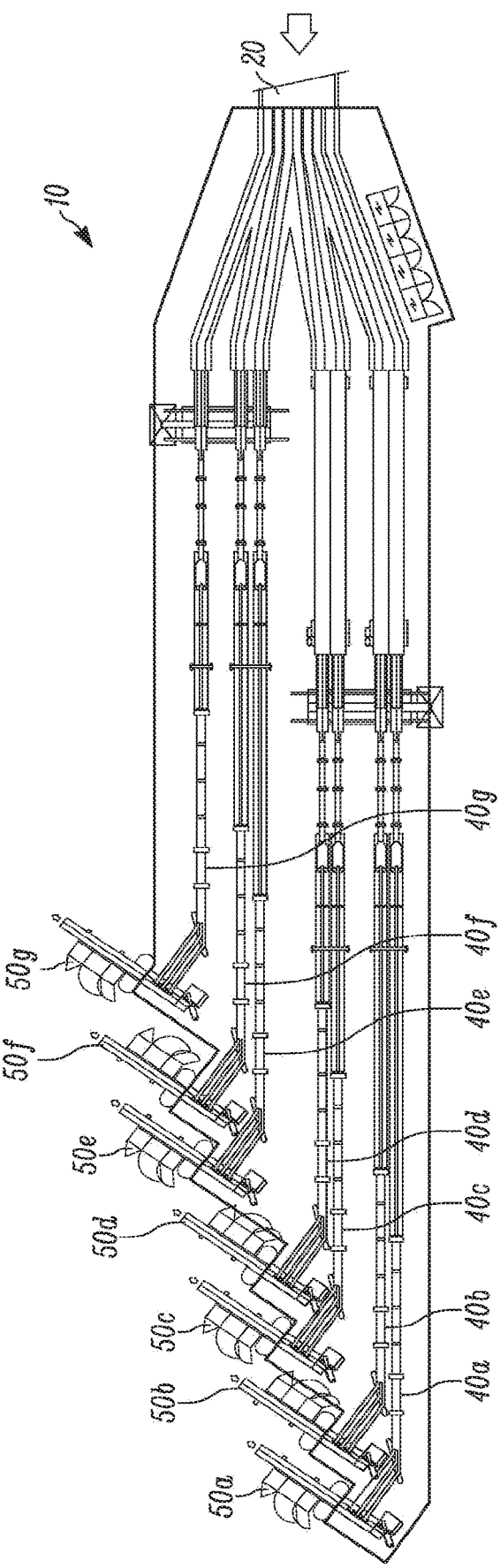
FIG. 1 is an overhead layout showing a conventional biscuit packaging system that employs individual lanes for each packaging machine.

The present disclosure describes examples of conveyor and packaging systems that present solutions to the issues discussed above with respect to the system 10 shown in FIG. 1. For example, the presently disclosed systems decouple independent conveyor lanes from dedicated packaging machines so that the operation of each lane does not depend on the continuing operation of a specific packaging machine. Instead, a common conveyor (or conveyor system) having a plurality of lanes transports biscuits independent of any specific packaging machine. A transfer device (e.g., a robotic arm) selectively transfers the biscuits to the packaging machines. In this manner, biscuits can be transferred to packaging machines without requiring specific conveyors to each specific packaging machine.

Figure 2:
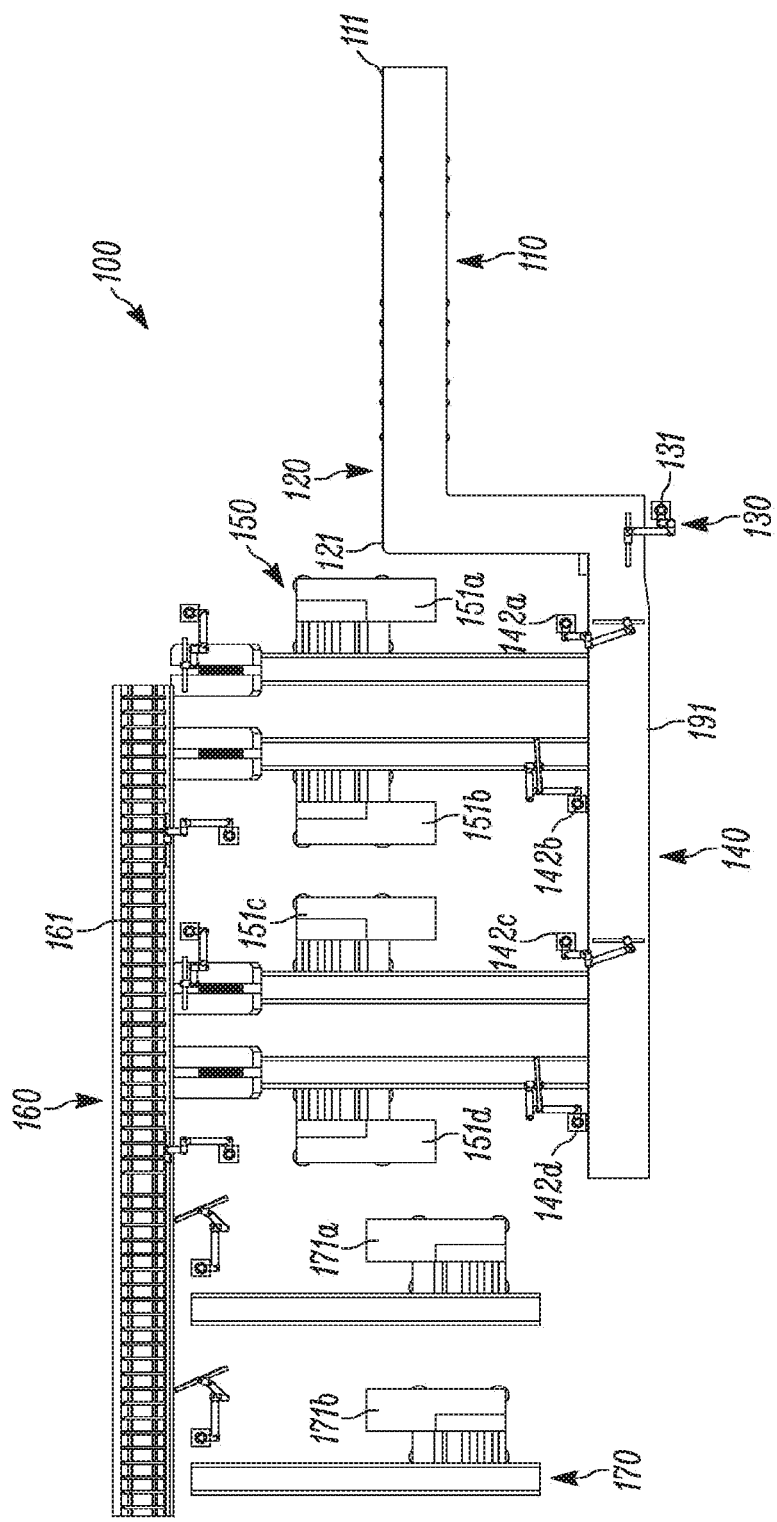
FIG. 2 is an overhead layout showing an example of a food product conveyor and packaging system in accordance with one or more embodiments described herein.

FIG. 2 is an overhead layout of such a conveyor and packaging system 100. The system 100 includes an upstream conveyor area 110, which is shown in greater detail in FIG. 3, as discussed below. The upstream conveyor area 110 includes an upstream conveyor 111 that leads biscuits to a turning area 120, which is shown in greater detail in FIG. 4. The turning area 120 includes a bend 121 that arranges the biscuits from the lanes of the upstream conveyor 111 into stacks that are generally perpendicular to the lanes of the upstream conveyor 111.

In one example, the upstream conveyor 111 equipment arranges the biscuits into arrays in a downstream bucket conveyor 141 at a feeding station 130. In feeding station 130, a feeding device 131 (e.g., a robotic volumetric feeder) facilitates the feeding and/or arranging of the biscuit stacks from the upstream conveyor 111 into the array of buckets on a bucket conveyor 141. A more detailed depiction of the feeding station 130 is shown in greater detail and in operation in FIGS. 5A-C.

Figure 6:
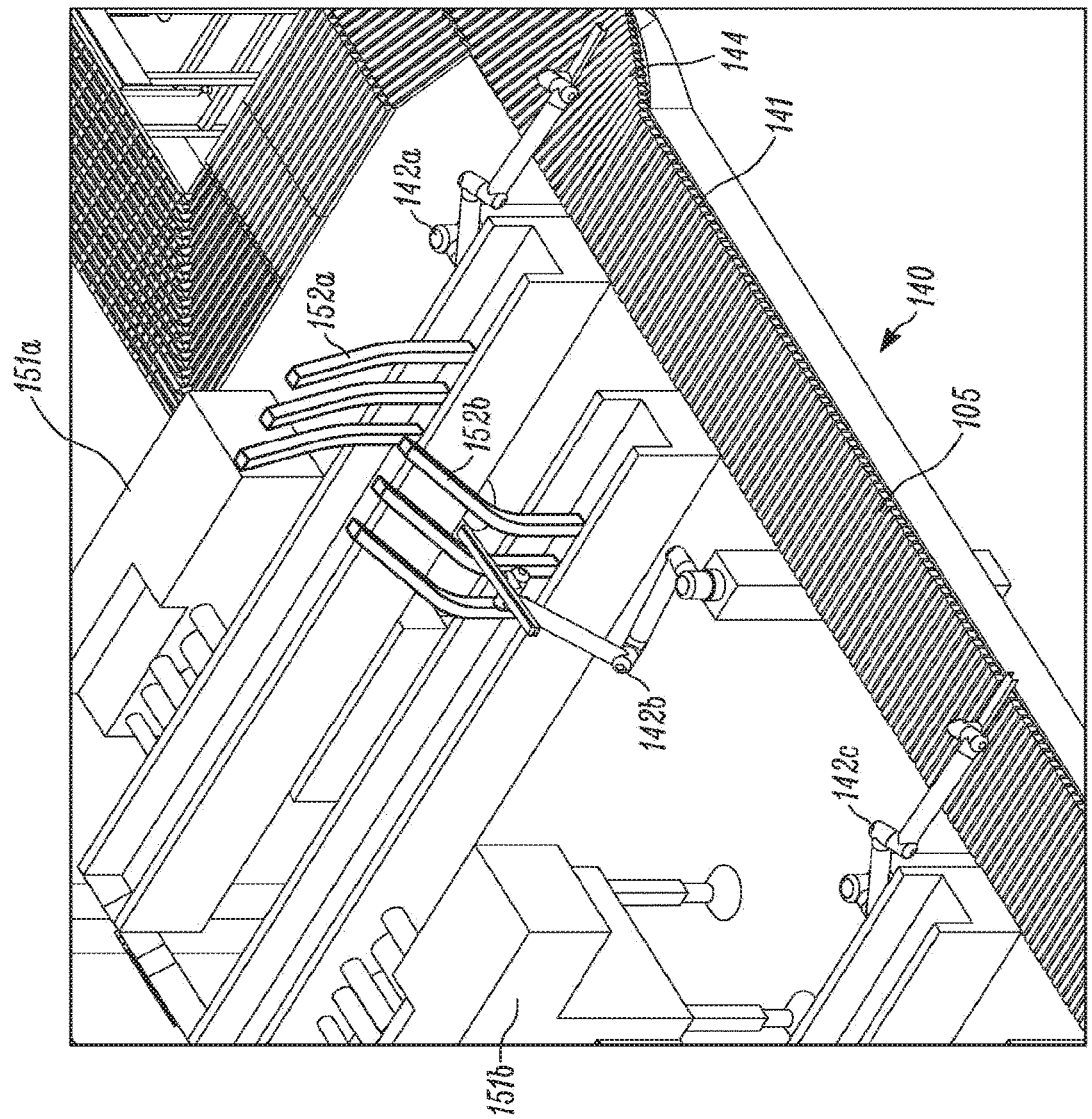
FIG. 6 shows a more detailed view of examples of a bucket conveyor area and a packaging station that can be employed in the food product conveyor and packaging system of FIG. 2.

The bucket conveyor 141 transports buckets (or trays) filled with stacks of biscuits toward a first packaging station 150, which can include one or more packaging machines 151n. A more detailed view of the bucket conveyor area 140 and the first packaging station 150 is shown in FIG. 6.

In some embodiments, the buckets 144 on the bucket conveyor 141 are linked together such that the movement of one bucket 141 directly corresponds to the movement of the other buckets 144 on the conveyor 141. That is, in this embodiment, when one bucket 144 moves a first distance along the conveyor 141, all buckets 144 move the same distance along the conveyor 141. In another embodiment, the buckets are unlinked and thus configured to move independent of one another. That is, because the buckets are not linked, one bucket 144 may be able to move forward or backward irrespective of the movement of the other buckets 144. In such a configuration, there may be space between each bucket 144 so that moving one bucket 144 does not necessitate movement of another bucket 144. An example of such a configuration is the Beckhoff XTS linear transport system. So configured, the buckets 144 may be able to move with different speeds and with different spacing there between. This can provide the ability to buffer buckets between packaging machines, which can help improve the ability to assure most or all buckets are used, thereby improving efficiency of the process.

The packaging machines 151 include or are associated with transfer devices 142n, which can be robotic arms that transfer stacks of biscuits from the buckets into individual packaging machines 151n of the first packaging station 150. In this manner, the system 100 can transfer stacks of biscuits from the conveyors to the packaging machines 151n without the use of intermediary conveyors specifically dedicated to each packaging machine 150n.

The transfer devices 142n can selectively choose to transfer only stacks of biscuits that are suitable for packaging to the packaging machines 151n. Unselected stacks may progress along the bucket conveyor 141 and be manually removed by a worker, or simply fall into a waste basket or bin. Moreover, if certain packaging machines 151n are inoperable, the system 100 will not need to shut down certain lanes of the conveyor system 100, as the packaging machines can take biscuits regardless of their conveyor lane or position.

As noted, the in some examples, the transfer devices 142n can be robotic arms. In general, a variety of types and configurations of robotic arms are available to operate as the transfer devices. One example of such a robotic arm is the UR10 robot, made by Universal Robots.

Figure 9A:
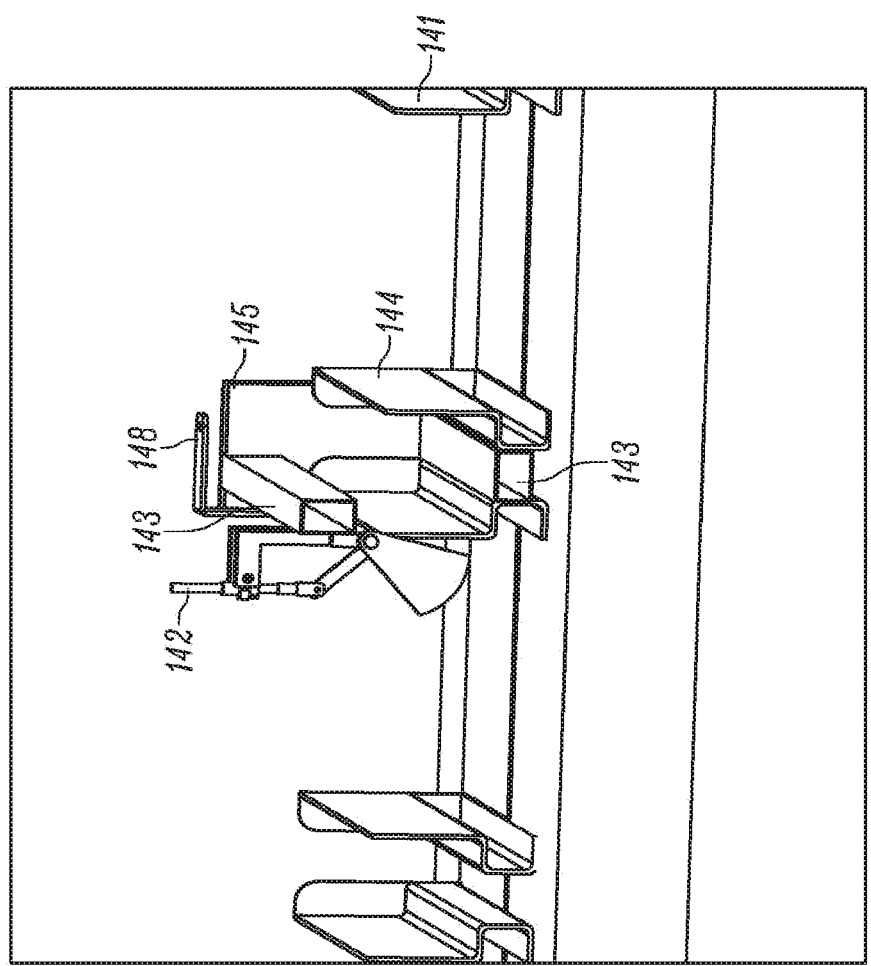
FIGS. 9A and 9B show an example of a transfer device interacting with a bucket of a bucket conveyor in accordance with one or more embodiments described herein.
Figure 9B:
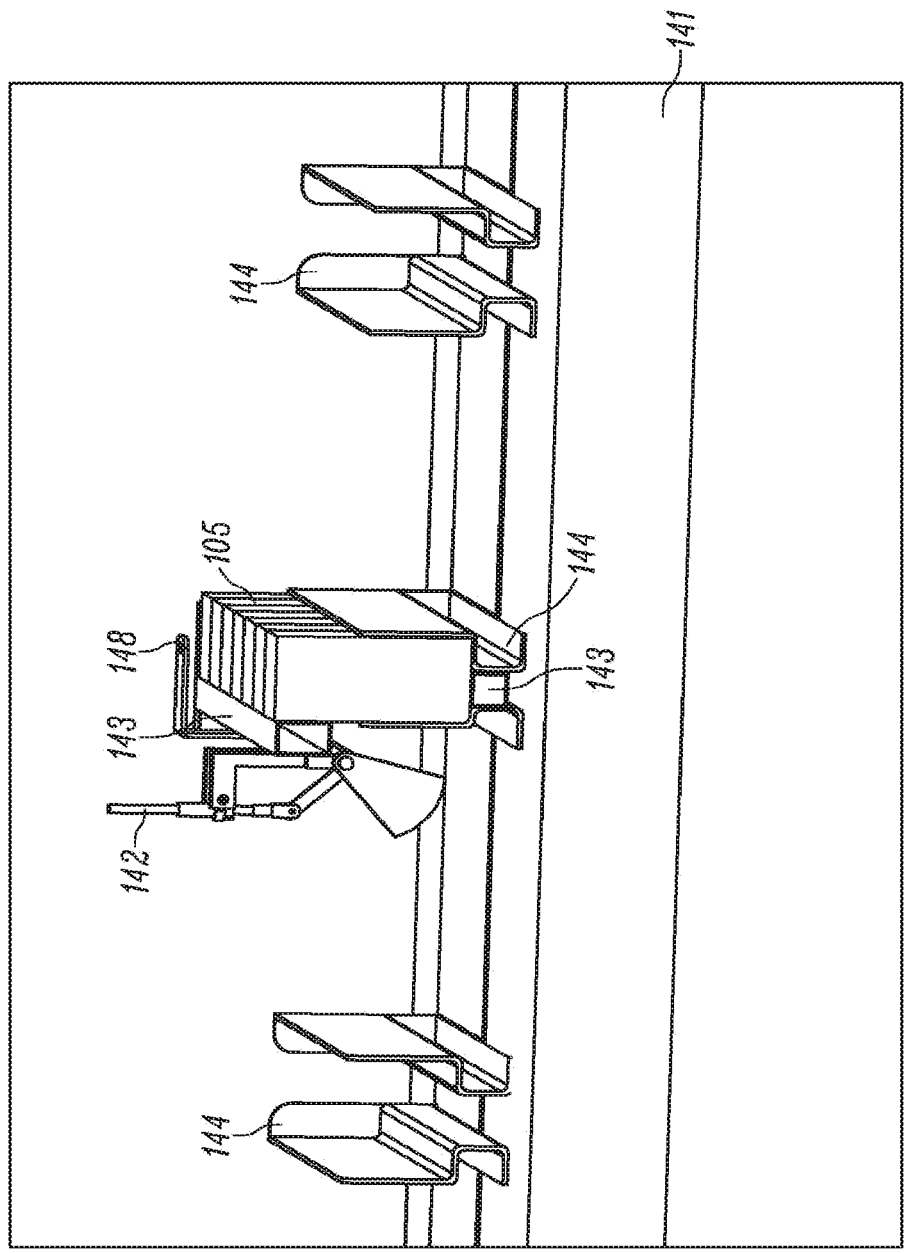

FIGS. 9A and 9B demonstrates how such a transfer device 142 interacts with a bucket to pick up a stack of biscuits 105. More specifically, FIG. 9A shows a transfer device interacting with an empty bucket 144, and FIG. 9B shows the same diagram with a biscuit stack 105 in the bucket 144.

As shown in FIGS. 9A-b, a bucket 144 can comprise a pair of vertical support members in between which the cracker stack 105 can be placed. The transfer device 142 can be configured with components that fit in locations with respect to the bucket 144.

Figure 10A:
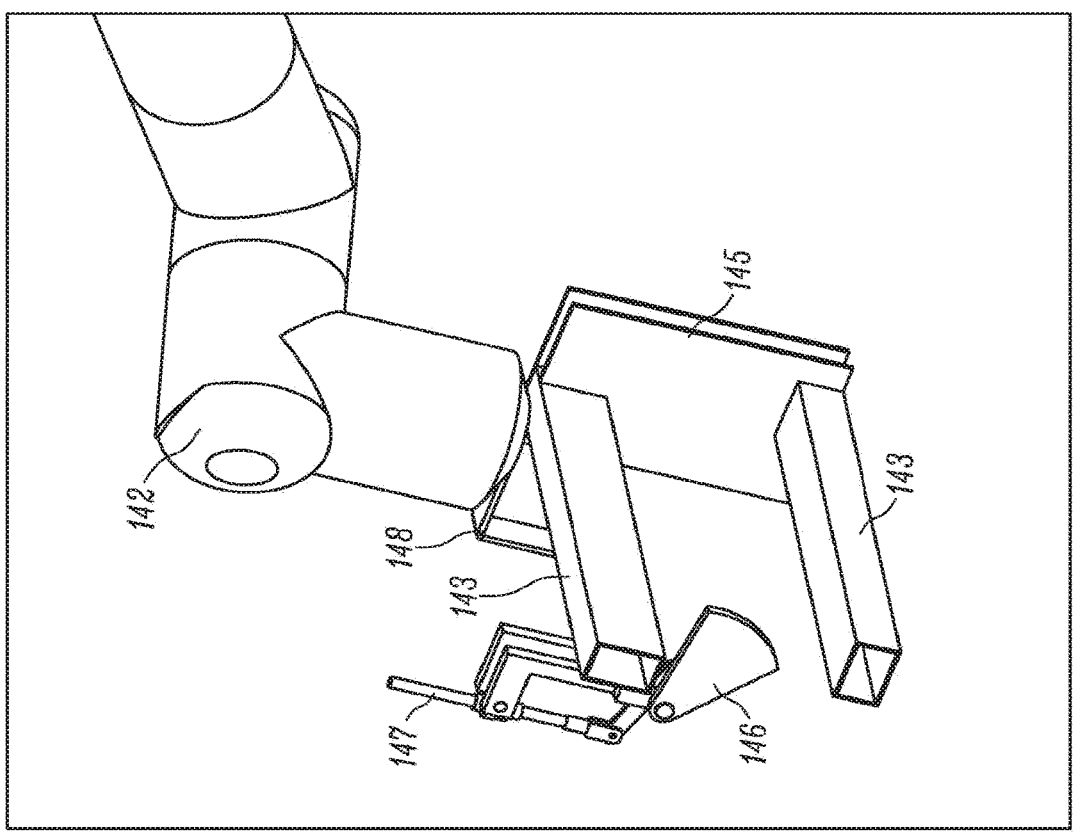
FIG. 10A shows another view of the transfer device of FIGS. 9A and 9B.
Figure 10B:
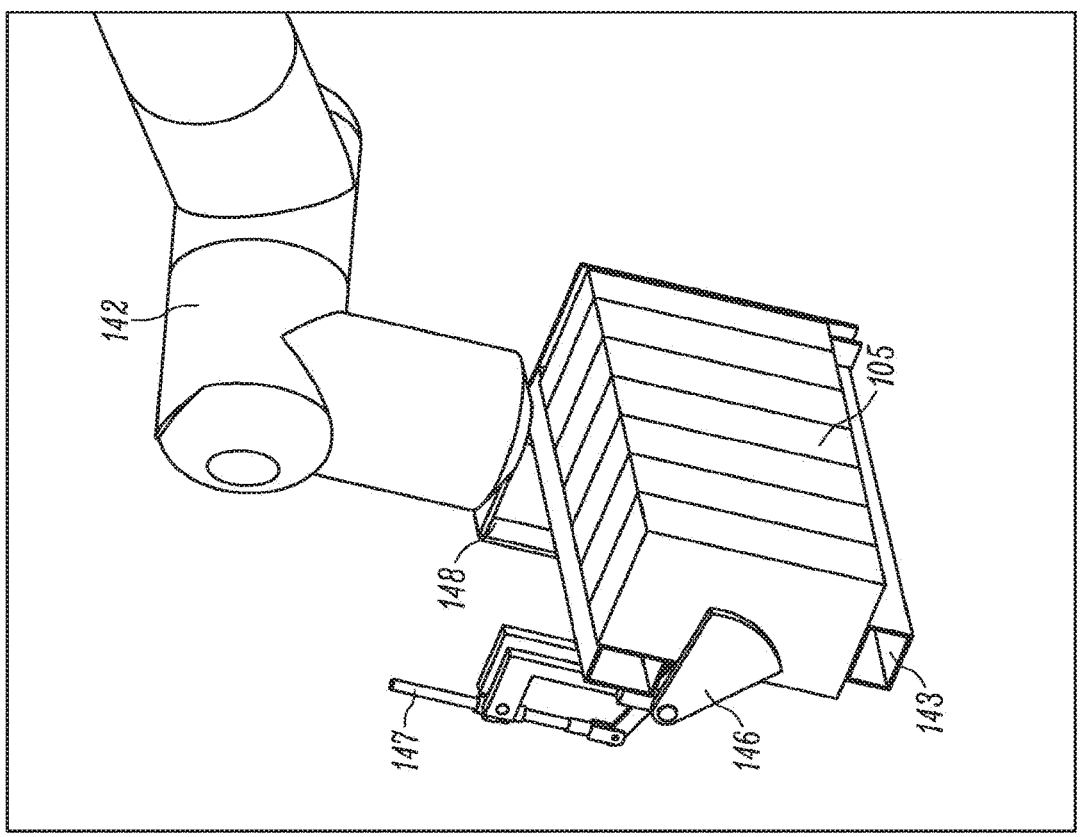
FIG. 10B shows an example of the transfer device of FIG. 10A holding a biscuit stack.

FIGS. 10A-B provide views of the transfer device 142 separate from the bucket. More specifically, FIG. 10A shows of the transfer device 142 alone, and FIG. 10B shows the transfer device 142 holding a biscuit stack 105.

The transfer device 142 can include a pair of prongs 143 that extend from a base platform 145. The prongs 143 can be configured to fit into recesses of the bucket 144 so that the biscuit stack 105 can be positioned between the prongs 143 and the base platform. A guide bar 148 can also be used to help keep the biscuit stack 105 within the grip of the transfer device 142 when the stack is rotated.

In some examples the transfer device 142 can also include a distal support member 146 to support the distal end of the cracker stack 105. The distal support member 146 can pivot as controlled by a piston 147. In this manner, the support member 146 can pivot away from the cracker stack 105 so that the prongs 143 can slide into position with respect to the bucket 144, and then pivot back up to hold the cracker stack 105 once the transfer device has properly grabbed it.

Figure 7:
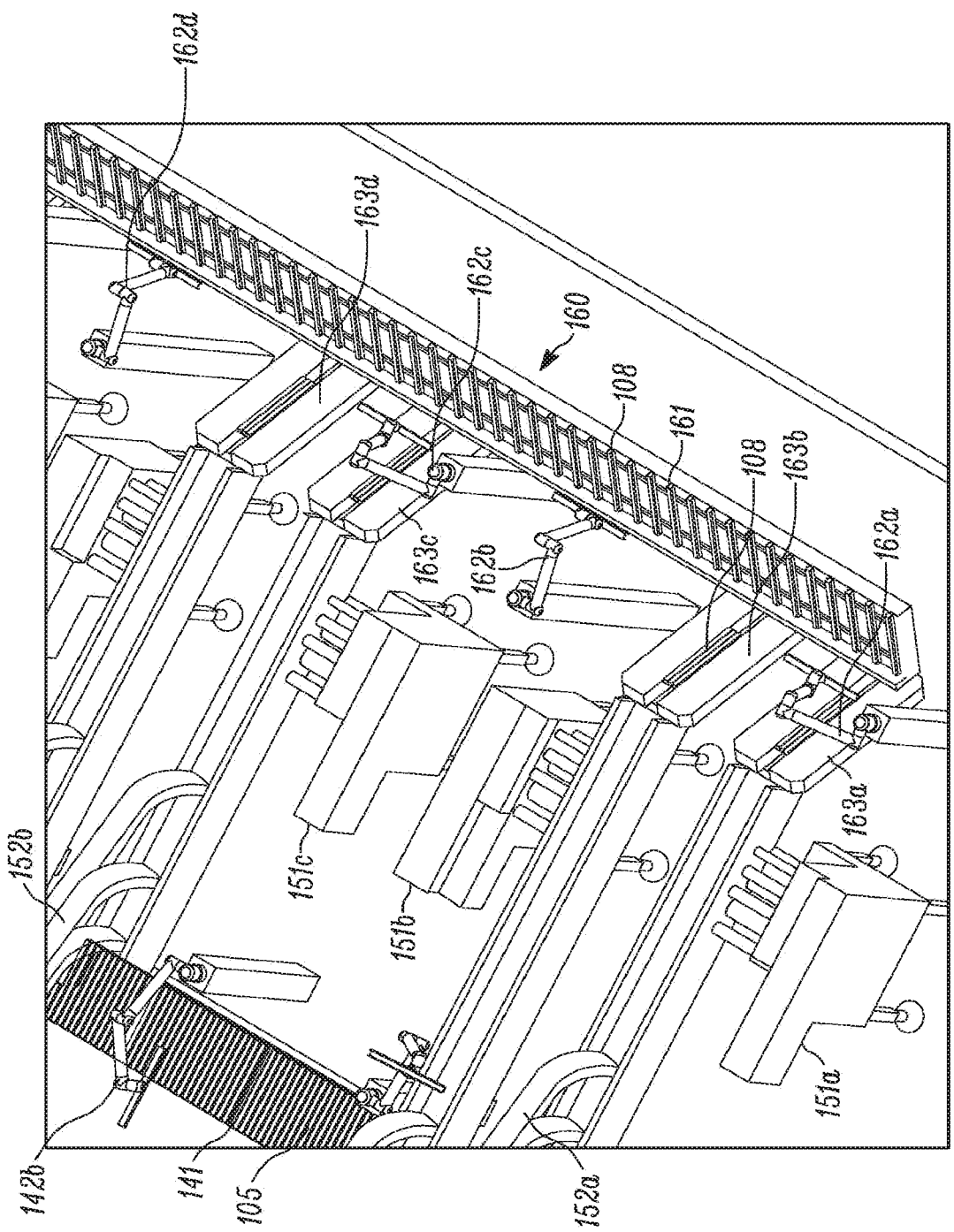
FIG. 7 shows a more detailed example of a packaging station and secondary conveyor area that can be employed in the food product conveyor and packaging system of FIG. 2.

In one example of a conveyor and packaging system 100, the packaging machines 151 place the stacks of biscuits into packaging (e.g., flow wrap packaging, boxes, wrappers, etc.), and move the packaged stacks to a secondary conveyor 161 in a secondary conveyor area 160. FIG. 7 provides another detailed view of the first packaging area 150, as well as the secondary conveyor area 160.

Figure 8:
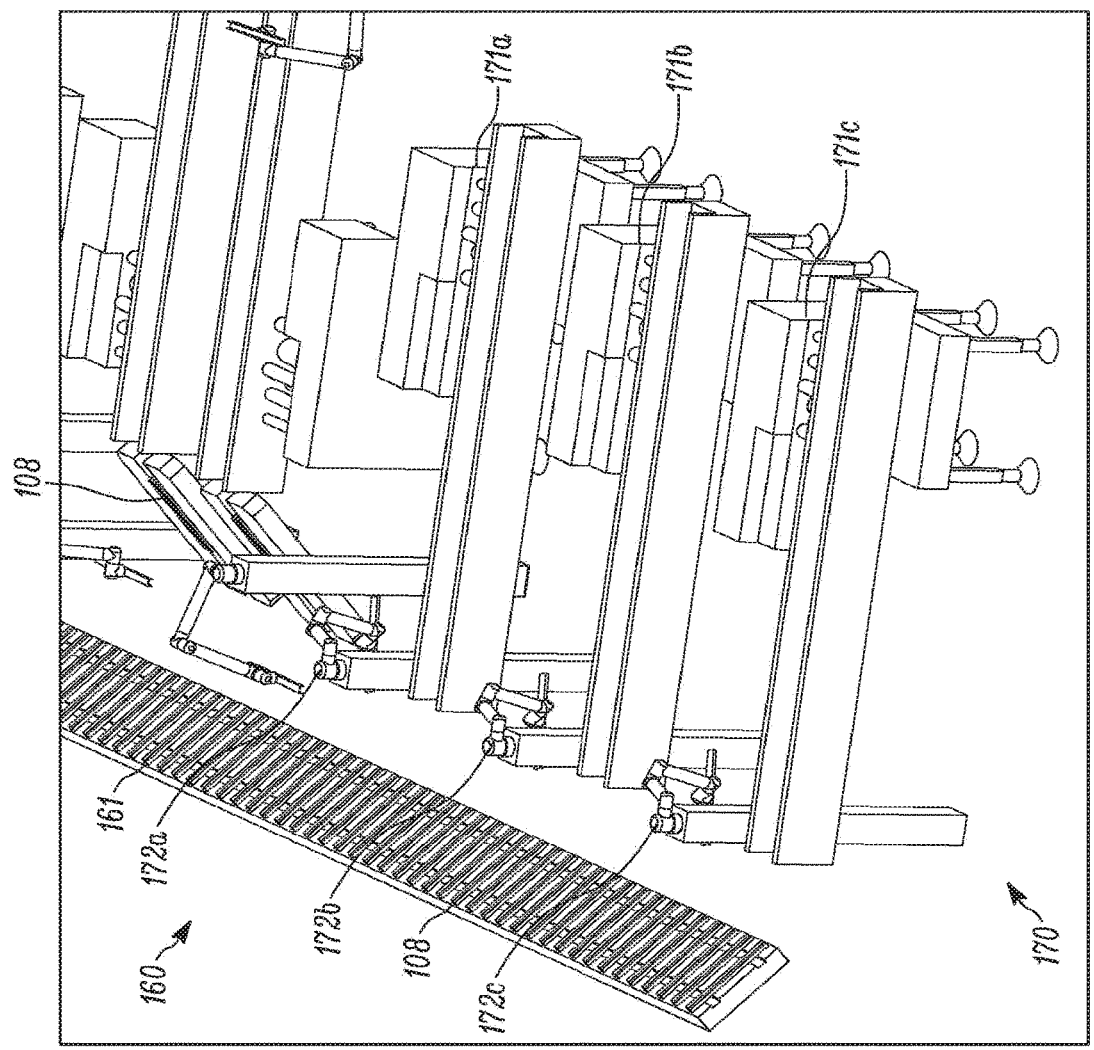
FIG. 8 shows a more detailed example of a secondary conveyor area and a secondary packaging station that can be employed in the food product conveyor and packaging system of FIG. 2.

Upon being loaded with packaged stacks of biscuits, the secondary conveyor 161 moves the packaged stacks toward a secondary packaging area 170 with one or more secondary packaging machines 171n. FIG. 8 shows another view of the secondary conveyor area 160 and the secondary packaging area 170 in greater detail. In the secondary packaging area, secondary packaging machines 171n place a secondary or outer package around the already-packaged stacks. For example, the secondary packaging machines 171 place the wrapped stacks into boxes, secondary wrappers, bags, or the like. It should be noted that not all products will have secondary packages, and thus not all systems falling within the scope of the present disclosure will include such secondary conveyor areas 160 or secondary packaging areas 170.

Figure 3:
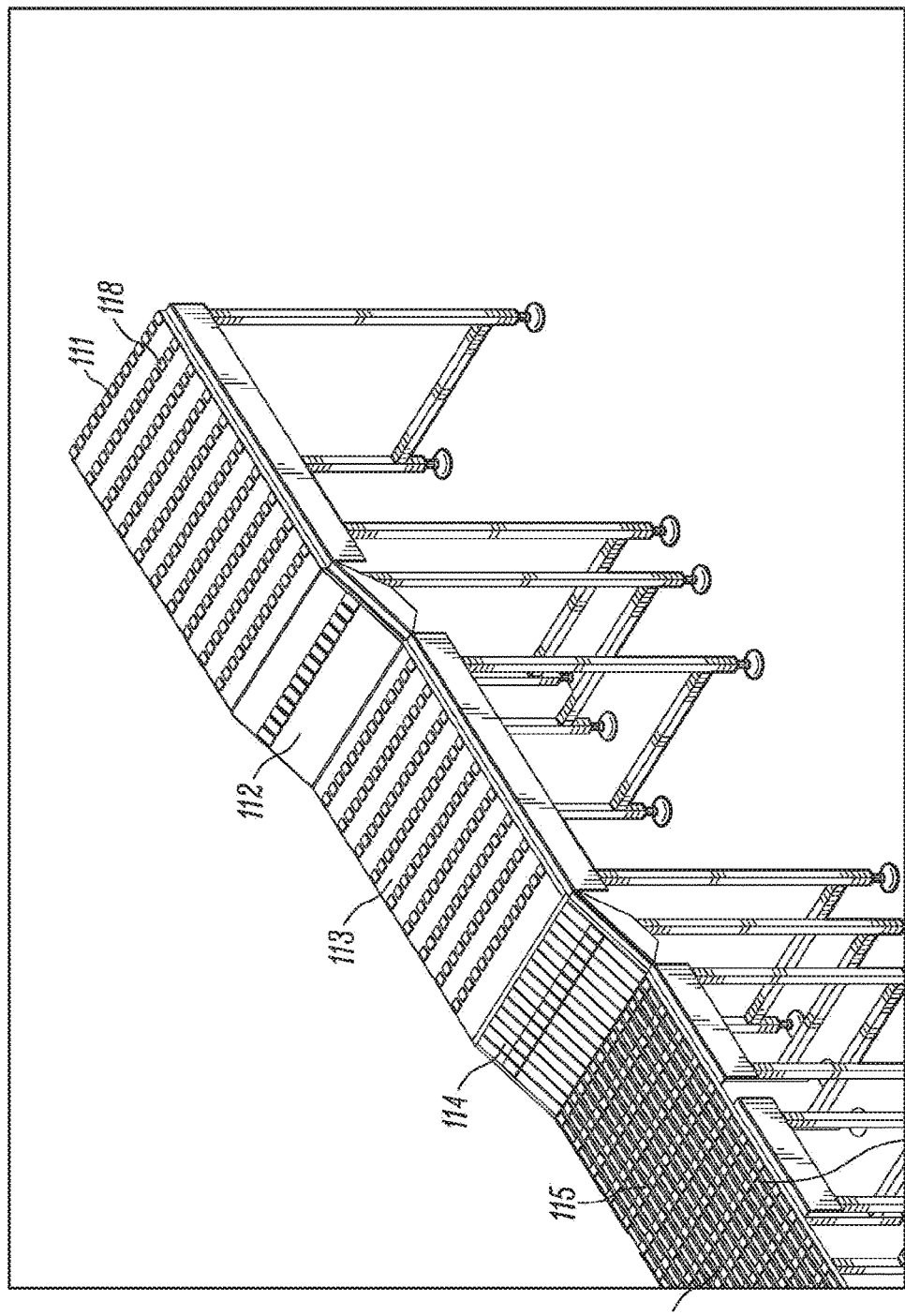
FIG. 3 shows a detailed view of an exemplary upstream conveyor area that can be employed in the food product conveyor and packaging system of FIG. 2.

As noted above, FIGS. 3-8 show various areas and stations of the system 100 in greater detail. FIG. 3 shows a more detailed view of an example of an upstream conveyor 111 that can be employed in the system 100 of FIG. 2. It should be noted that some examples of the upstream conveyor 111 may employ a single conveyor line that uses a single conveyor belt or platform from beginning to end. In other examples, however, the upstream conveyor 111 may comprise components or portions, each of which may be individually considered a separate conveyor. For example, as shown in FIG. 3, the upstream conveyor 111 includes a receiving portion 118, an inspection area 113, and a penny stacker portion 115, each of which may be considered separate conveyors that employ separate conveyor belts.

The upstream conveyor 111 includes a receiving portion 118 that receives biscuits. In some examples, the receiving portion 118 is adjacent an oven so that biscuits are transferred to the receiving portion 118 upon discharge from the oven. In some examples the biscuits received in the receiving portion 118 will generally lie flat on the conveyor 110 and will not overlap one another. That is, in some examples, the biscuits on the receiving portion 116 of the upstream conveyor will not be stacked.

In some approaches, the upstream conveyor includes a first dribbleboard 112 that moves the biscuits down a slope. The first dribbleboard 112 moves the biscuits to an inspection area 113. In the inspection area 113, biscuits can be inspected for damage or other issues. This inspection can be performed by a camera and/or a manual worker assigned to inspect the products. Biscuits that are broken, damaged, or otherwise unsuitable for packaging can be removed from the conveyor 111.

Downstream from the inspection area 113 on the upstream conveyor 111 is a second dribbleboard 114. The second dribbleboard 114 can provide lane balance so that the biscuits are arranged to flow into individual lanes 117. That is, in this portion of the upstream conveyor 111, the biscuits can move from one lane to another so that each generally contains the number of biscuits therein.

Downstream of the second dribbleboard 114 is a gap closing, or penny stacker portion 115. In the penny stacker portion 115, the lanes can narrow to ensure that the biscuits are arranged to begin the stacking process. In this portion, the biscuits may begin to overlap with one another, for example, such that an edge of one biscuit rests upon an edge of an adjacent biscuit. Biscuits passing through the penny stacker portion 115 pass to a straight vibratory portion 116 that leads to the turning area 120.

Figure 4A:
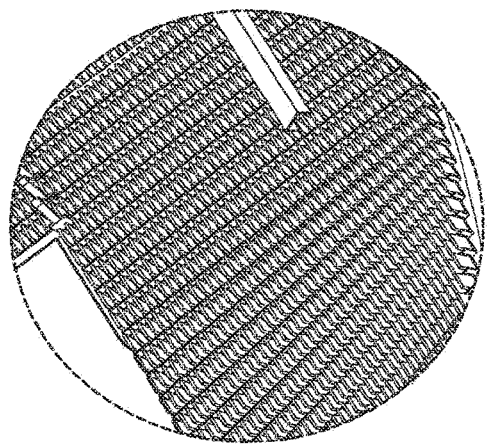
FIGS. 4 and 4A shows a more detailed view of an exemplary turning area that can be employed in the food product conveyor and packaging system of FIG. 2.
Figure 4:
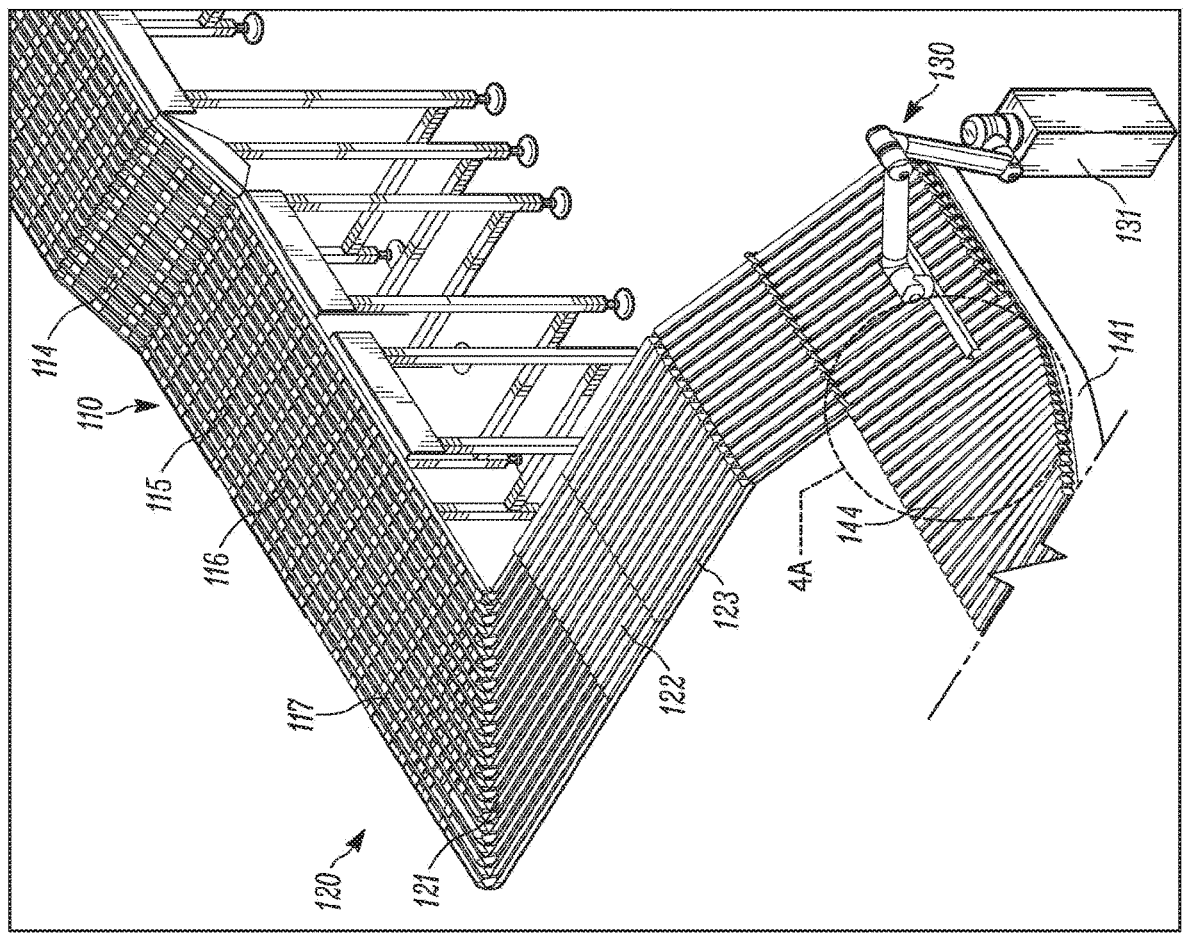

FIG. 4 shows a more detailed view of an exemplary turning area 120. To reduce clutter in the drawings, the individual biscuits in stacks are not shown, however the view in FIG. 4A shows the biscuit stacks in more detail to show the individual biscuits. Figure In some examples, the upstream conveyor 111 includes a straight vibratory portion 116 that leads to the turning area 120. In some formats, the straight vibratory portion 116 starts to stack the biscuits in the lanes 117 of the conveyor 111. For example, the straight vibratory portion 116 may vibrate the lanes 117, thereby causing the biscuits to vibrate, which can initiate the stacking process. That is, the biscuits may begin to tilt up on their sides so that they are no longer lying flat on the conveyor.

The upstream conveyor 111 moves biscuits from the straight vibratory portion 116 through a bend 121. The bend 121 can also be a vibratory portion that continues to vibrate the biscuits to facilitate the stacking process. For example, while passing through the bend 121, the biscuits can begin or continue to turn from lying flat to vertical, short side leading.

The turning area 120 turns the individual lanes 117 through bend 121 toward an end portion 122 of the upstream conveyor 111. In some approaches the bend 121 is be a 90 degree bend that turns the lanes 123 of the end portion 122 generally perpendicular to the lanes 117 in the upstream area 110 of the upstream conveyor 111. The angle of the bend 121 can vary depending on the layout of the equipment; in particular, the angle can vary depending on the location of the oven or the receiving portion 118 of the upstream conveyor 111 with respect to the bucket conveyor 141. In some examples, the bend 121 will be configured so that the lanes 123 of the end portion 122 of the upstream conveyor 111 are generally perpendicular to the bucket conveyor 141.

In this manner, the lanes 123 of the end portion 122 can align to fill the buckets 144 of the bucket conveyor 141.

In some examples the process of stacking the biscuits (i.e., turning the biscuits from flat and non-overlapping to a stacked orientation) will be generally complete as biscuits enter the end portion 122 of the upstream conveyor 111. The lanes 123 of the end portion 122 of the upstream conveyor 111 can thus feed the stacks of biscuits into buckets 144 in the bucket conveyor 141 at the feeding station 130.

In some examples, the end portion 122 of the upstream conveyor slopes downward from a higher elevation to a lower elevation so that gravity can facilitate the stacks of biscuits moving toward the feeding station 130 and the bucket conveyor 141. In some examples the end portion 122 is also vibratory to facilitate the stacking process or the movement of the stacks of biscuits toward the feeding station 130.

Figure 5A:
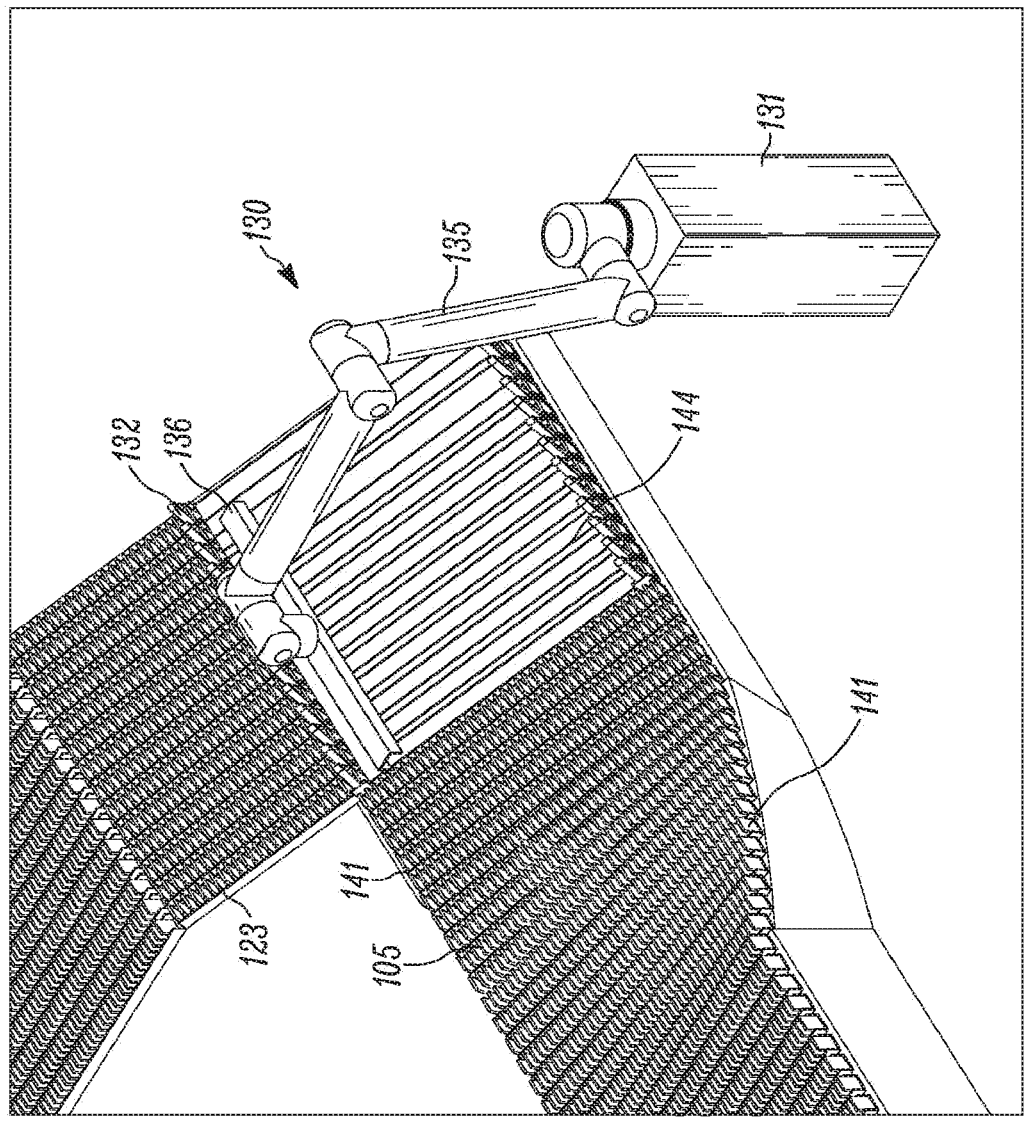
FIGS. 5A, 5B, and 5C demonstrate an example of the operation of a feeding station that can be employed in the food product conveyor and packaging system of FIG. 2.
Figure 5B:
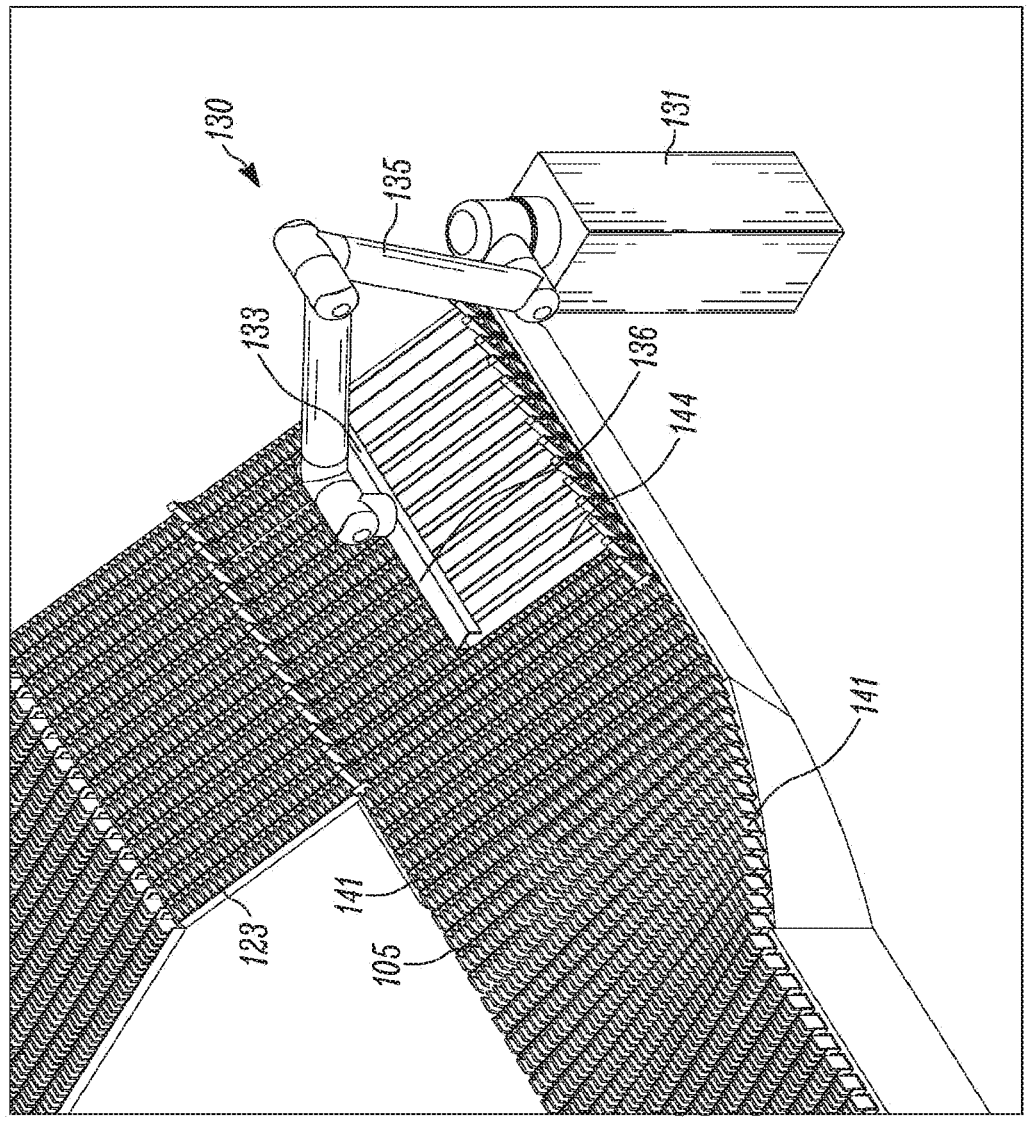
Figure 5C:
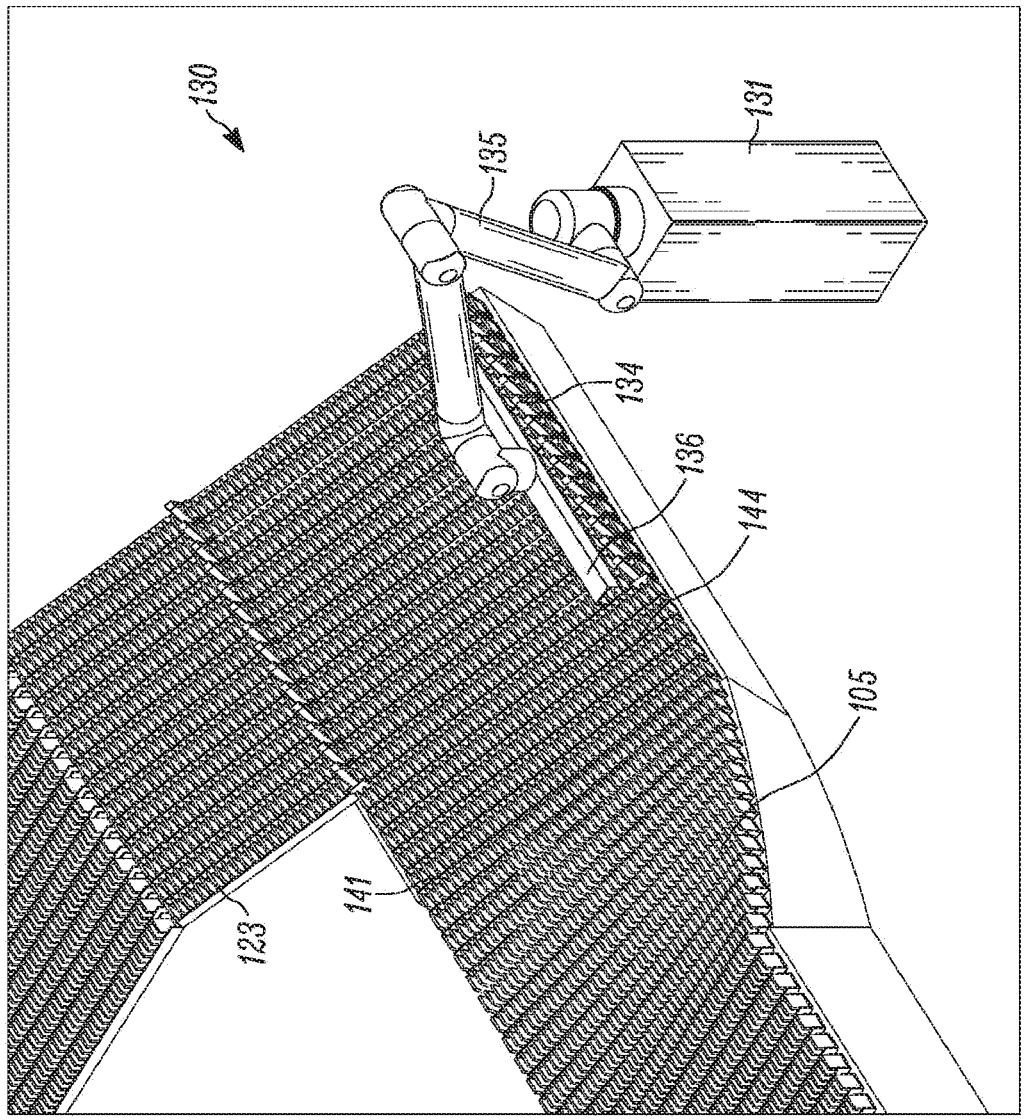

FIGS. 5A-C show a more detailed view of the feeding station 130 at various stages of the feeding process. In some approaches, the feeding station 130 includes a feeding device 131 to facilitate guiding the biscuits into the buckets 144 of the bucket conveyor. For example, the feeding device 131 can include a robotic volumetric feeder that feeds and/or arranges of the biscuits from the upstream conveyor 111 into the array of buckets on a bucket conveyor 141. In some examples the lanes 123 of the end portion 122 of the upstream conveyor 111 align with the buckets 144 of the bucket conveyor 141 at the feeding station such that each lane 123 can supply a bucket 144 with a stack 105 of biscuits.

FIGS. 5A, 5B, and 5C each present an example of the feeding station 130 at various stages of the feeding process. The feeding device 131 is shown as a robotic volumetric feeder that includes a robotic arm 135 and a platform 136. The platform supports the biscuit stacks in the lanes 123 of the end portion 122. As the robotic arm 135 lowers the platform 136, the biscuit stacks arrange themselves into buckets 144 of the bucket conveyor 141.

The buckets 144 can be sleeves, or channels that are designed to hold a single stack 105 of biscuits. The buckets 144 can have a variety of cross sectional shapes depending on the shape of the biscuit that it is intended to hold. For example, in some examples the buckets 144 will have a rounded bottom to hold round biscuits, an angled v-shaped bottom to hold triangular or diamond shaped biscuits, or a squared bottom to hold square shaped biscuits. Other shaped buckets 144 can also be employed where biscuits of other shapes are used.

FIG. 5A shows the feeding device at an initial position 132. Here, the platform 136 is positioned near the top of the bucket conveyor 141, and thus the biscuit stacks 105 have not yet entered into the buckets 144. FIG. 5B shows the feeding device 131 in an intermediary position so that the buckets 144 of the bucket conveyors are approximately half-way filled. FIG. 5C shows the feeding device 131 at an end position 135, whereby the buckets have been allowed to fill the buckets 144 to the desired capacity.

Because the upstream conveyor 111 is generally at a higher elevation than the bucket conveyor 141, the end portion 122 of the upstream conveyor 111 slopes downhill to the bucket conveyor 131. In this manner, gravity facilitates transfer of the stacks of food products from the upstream conveyor to the bucket conveyor. The feeding device 131 controls the lowering of the stacks of food products from the lanes of the upstream conveyor into buckets. The feeding device 131 helps assure that the biscuits are properly placed into the buckets in a controlled manner to help prevent damage to the biscuits during this process.

Once the stacks 105 of biscuits are fed into the buckets 144, the bucket conveyor transports the stacks toward the feeding station 150. FIG. 6 provides a more detailed view of the bucket conveyor area 140 of the system 100. In some formats, the bucket conveyor 141 is arranged to transport the buckets 144 in a direction perpendicular to the lanes 123 of the end portion 122 of the upstream conveyor 111. Put another way, the bucket conveyor 141 transports the buckets 144 in a direction perpendicular to the length of the buckets 144, or the stacks 105 within the buckets 144.

In some examples, the bucket conveyor 141 at the feeding station 130 is sloped at an angle as shown in FIGS. 4-6. That is, the feeding station 130 may generally share the same slope as the end portion 122 of the upstream conveyor 111 to facilitate the feeding process. Accordingly, the bucket conveyor 141 may be arranged to bring the conveyor surface back to horizontal as the bucket conveyor 141 approaches the packaging station 150 as shown in FIGS. 4-6.

The bucket conveyor 141 transports the buckets to a feeding station 150, where transfer devices 142*n* load stacks 105 of biscuits into individual packaging machines 151*n*. In some examples, the packaging system 150 will include a plurality of packaging machines 151*n* as shown in FIGS. 2 and 6.

The packaging machines 151*n* may include or operate in association with one or more transfer devices 142*n* that selectively load biscuit stacks 105 from the bucket conveyor 141 to the packaging machine 151*n*. For example, each transfer device 142*n* may be specifically associated with individual packaging machines 151*n* such that each transfer device (e.g., 141*a*) loads stacks 105 of biscuits into one and only one packaging machine (e.g., 151*a*).

In other examples, the system 100 may employ transfer devices 142 that are associated with more than one packaging machine 151. That is, in some examples, one transfer device 142 can be configured to load biscuit stacks 105 into two, three, or more different packaging machines. In still other examples, packaging machines 151 can be configured to be loaded from more than one transfer device 142, or to share multiple transfer devices 142 with multiple packaging machines 151.

Generally speaking, the transfer devices 142 selectively load biscuit stacks 105 from the bucket conveyor 141 to the packaging machines 151 without employing an intermediary conveyor. In some examples, the transfer devices 142 comprise a robotic arm that selectively grabs the biscuit stacks 105 from the bucket conveyor 141 and transfers the stacks 105 to the packaging machines 151. The robotic arms can be lightweight and flexible and have a low profile so as to reduce floor space that they occupy.

In some embodiments the transfer devices 142*n* are operated by a control module that controls operation of the transfer devices 142. The control module may include a computer processor that communicates with various components of the system 100 to facilitate control of the packaging process. The control module may be in communication with various inspection related equipment so that the control module can determine which biscuit stacks 105 in the buckets 144 are suitable for packaging. For instance, the control module may learn that a certain bucket 144 comprises an insufficient number of biscuits, broken biscuits, or other problems rendering the corresponding biscuit stack 105 unsuitable for packaging. In such a situation, the control module may control the transfer devices to skip or dispose the problematic biscuit stack.

In other examples, the control module may be in communication with the equipment of the system so that the control module can determine which packaging machines 151 are operating properly. For example, where a certain packaging machine 151n is not working properly, the control module may disable the transfer device 142n associated with that machine, or assign that transfer device 142n to another packaging machine 151.

In some aspects, the transfer devices 142n will load cracker stacks into an input 152n of a packaging machine 151n. The input 152n can be a vibratory flowpack feeder that includes, for example, a channel that flows into packaging lanes of the packaging machine 151n. In some examples, each packaging machine 151n may include a plurality of inputs 152n so that the packaging machine 151n can package multiple biscuit stacks at a time.

FIG. 7 shows a more detailed example of a packaging station 150 having a plurality of packaging machines 151n. As shown, each packaging machine has an input 152n, or a plurality of inputs. The inputs 152n feed the corresponding packaging machines with a biscuit stack 105, whereby the packaging machine 151 packages the stack 105. The packaging machines 151 can apply packaging in a variety of forms. For example, the packaging machines can package the stacks 105 paper or plastic sleeves, bags, boxes, tubes, cans, flow wrap packages, etc.

It should be noted that FIG. 2 shows a system 100 that employs four packaging machines 151, each with a separate transfer device 142; however, certain embodiments and implementations of the presently disclosed systems and methods can employ more or fewer machines as appropriate for the process.

FIG. 7 also shows a secondary conveyor area 160 that can be employed in the food product conveyor and packaging system of FIG. 2. The packaging machines 151n include a secondary collation station 163n where packaged stacks 108 are discharged from the packaging machines 151n. Other transfer devices 162n, which can be robotic arms, feed the packaged stacks 108 from the packaging machines 151n to the secondary conveyor 161. The secondary conveyor 161 then transports the packaged stacks toward the secondary packaging station 170.

FIG. 8 shows a more detailed example of a secondary conveyor area 160 and a secondary packaging station 170. As shown, the secondary packaging station can include a plurality of secondary packaging machines 171n. It is noted that FIG. 2 depicts two secondary packaging machines 171 while FIG. 8 shows three secondary packaging machines 171. Indeed, the secondary packaging station 170 may employ fewer or more secondary packaging stations as driven by the demands of the packaging process. The secondary packaging machines 171n each employ a feeding mechanisms 172n, which can be robots, that feed the secondary packaging machines 171n with the once-packaged stacks 108 of biscuits from the secondary conveyor 161. The secondary packaging machines 171 apply a secondary package to the packaged stacks 108. For example, the secondary packaging machines 171 can put the packaged stacks 108 in bags, boxes, wrappers, trays, cartons, or the like.

An example of the operation the conveyor and packaging system 100 is as follows. Biscuits are discharged from an oven are placed on the receiving portion 118 of the upstream conveyor 111. The biscuits lie generally flat and non-overlapping on the conveyor and traverse downstream along the conveyor 111 towards a turning area 120. At or around the turning area 120, the biscuits are channeled into lanes.

While in lanes 117, the biscuits begin to arrange into stacks. For example the biscuits may be vibrated along the conveyor so that the biscuits begin to overlap and turn vertical. The biscuit stacks approach the end portion 122 of the upstream conveyor 111 traveling in a direction perpendicular to the bucket conveyor 141. In this way the biscuit stacks 105 align with the buckets 144 so that the stacks 105 can be fed therein. A feeding device 131 facilitates the feeding of the biscuit stacks 105 into the buckets at a feeding station 130.

The buckets 144 then proceed along the bucket conveyor 141 in a direction generally perpendicular to the length of the stacks 105. As the buckets 144 approach a packaging station 150, transfer devices 142 (e.g., robotic arms), pick up the stacks 105 and feed the stacks 105 into inputs 152 of individual packaging machines 151. Thus, the stacks 105 can be transferred to the packaging machines 151 without passing along a separate, dedicated conveyor.

The packaging machines 151 package the stacks and place the stacks onto a secondary conveyor 161, which transports the packaged stacks 108 to a secondary packaging station 171. The secondary packaging station 171 can apply a secondary, or outer, package to the packaged products 108.

The presently described system provides several efficiencies and advantages over other conveying and packaging systems. One example of such an advantage is a reduction in the number of manual workers to facilitate efficient operation of the system. Because the biscuits travel together on a single conveyor as opposed to separate conveyor lanes dedicated to each packaging machine, the process is more compact. Thus, individual workers can oversee a larger portion of the process, thereby minimizing the headcount.

Another advantage that the presently disclosed system 100 provides is the ability to skip biscuit stacks that are not suitable for packaging. For instance, if one of the buckets has an irregular stack or broken biscuits, then the feeding devices can simply skip that bucket. Further, if one of the packaging machines is inoperable, then all of the buckets can be still processed using the other packaging machines.

Still another advantage of the presently disclosed system includes the ability to effectively function while occupying reduced floor area. Because the system 100 does not employ dedicated conveyor lanes for each packaging machine, the size of the equipment employed, and the floor space it occupies, can be much smaller. For example, in some settings the system 100 of FIG. 2 may occupy 120 m$^2$ as compared to the 950 m$^2$ or more of floor space occupied by the conventional system of FIG. 1.

Figure 11:
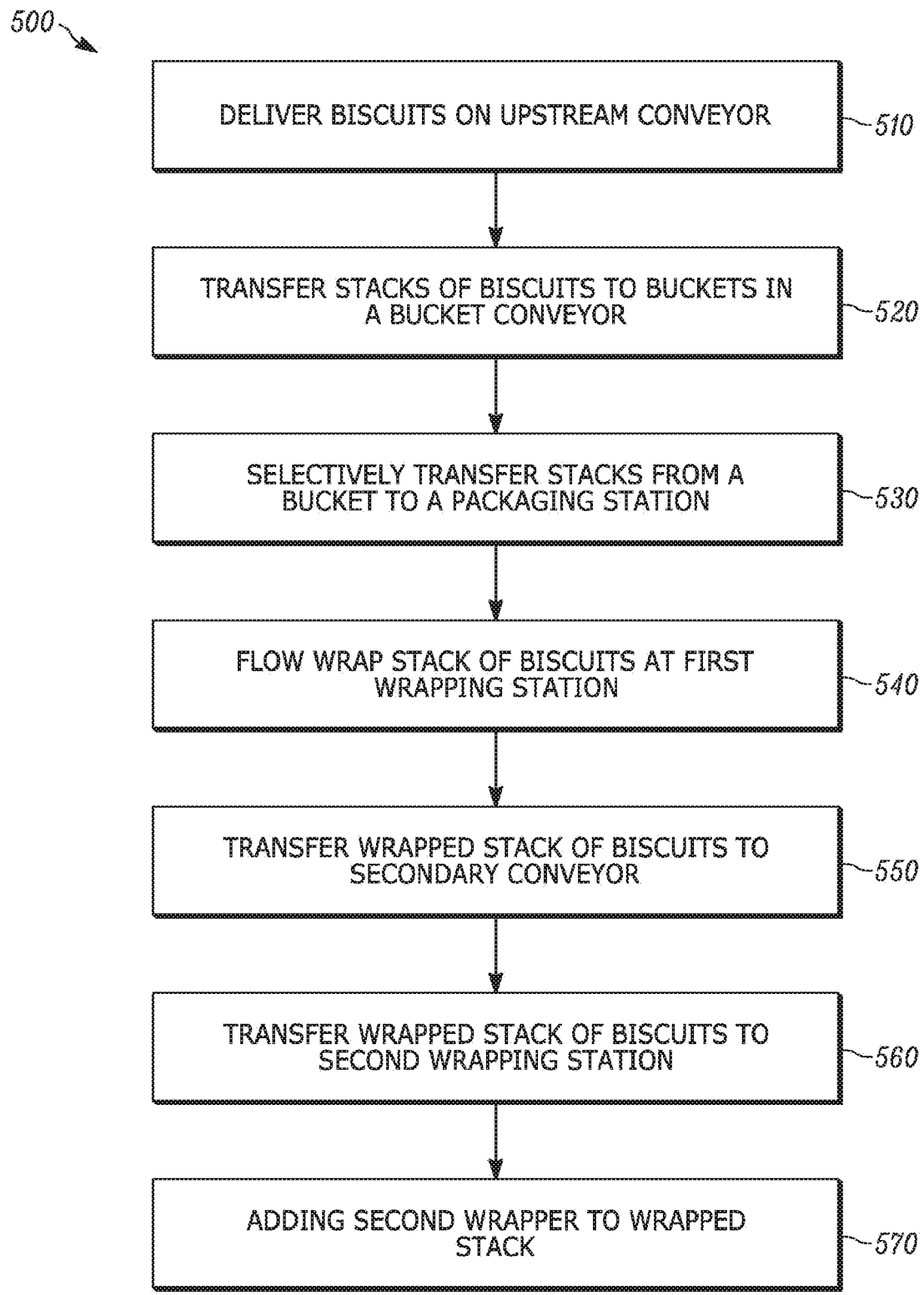
FIG. 11 is a flow diagram of an example of a method for conveying and packaging food products described herein.

The present disclosure also presents methods for conveying and packaging food products. FIG. 11 is a flow diagram of an example of a method 500 for conveying and packaging food products described herein.

At step 510, biscuits are delivered onto an upstream conveyor. At step 510 biscuits can be delivered directly from an oven, or from another device. The biscuits received can be generally flat and non-overlapping. The biscuits are conveyed into a plurality of lanes, where the biscuits are turned into stacks on the upstream conveyor. In some examples, the biscuits and/or biscuit stacks can turn through a bend such that the biscuits at the end of the conveyor travel in a direction perpendicular to the direction biscuits travel at the receiving end of the conveyor. In some examples, at step 510, the previously flat and non-overlapping biscuits are turned onto their sides and stacked within the lanes of the upstream conveyor.

At step 520, biscuits are transferred to buckets in a bucket conveyor. Step 520 may include feeding the stacked food products into a plurality of buckets on a second conveyor (e.g., a bucket conveyor) so that each lane of the plurality of lanes feeds into a separate bucket. In some examples, each individual bucket will hold an individual stack of biscuits. Also at step 520, the biscuit stacks are conveyed along the second conveyor in a direction perpendicular to the lanes at the end of the upstream conveyor.

Next, at step 530, individual stacks of biscuits are selectively transferred from the second conveyor to a packaging station. For example, at step 530, biscuits can be transferred by a robotic arm to an input of a packaging machine using at least one robotic arm. Notably, at step 530, the individual stacks of biscuits can be transferred from the secondary conveyor—which is a common conveyor conveying all biscuits regardless of the packaging machine destination— to individual packaging machines without employing an intermediary conveyor.

In some examples, at step 530, a first robotic arm selectively transfers a first biscuit stack to a first packaging machine associated with the first robotic arm, while a second robotic arm transfers a second biscuit stack to a second packaging machine associated with the second robotic arm. The first robotic arm may then selectively grab a third stack of biscuits and transfer that biscuit stack to the first packaging machine, while the second robotic arm transfers a fourth biscuit stack to the second packaging machine. That is, the robotic arms can repeatedly and selectively transfer independent stacks of biscuits from a common conveyor (e.g., the second or bucket conveyor) to separate independent packaging machines.

In some approaches, the method can include, at step 530, determining which of the individual stacks of food products conveying along the second conveyor are suitable for packaging. In such an approach, at least one of the transfer machines/robotic arms may bypass or dispose of certain biscuit stacks that are deemed to be unsuitable for packaging.

At step 540, biscuits are flow wrapped at a first wrapping or packaging station. For example, at step 540, biscuits can be packaged into packaged stacks by packaging machines.

At step 550, the wrapped/packaged biscuit stacks are transferred to a third conveyor, such as secondary conveyor 161 described herein with respect to FIGS. 2-8.

The secondary conveyor then transfers the wrapped stack of biscuits to a secondary wrapping station at step 560. The secondary wrapping station can employ one or more secondary packaging machines that use robotic arms to transfer the wrapped or packaged biscuit stacks from the third conveyor to the second wrapping station.

At step 570, the secondary wrapping station applies a second wrapper or package to the once-packaged biscuit stack. For example, the secondary wrapping station can apply an outer package around one or more of the once-packaged biscuit stacks.

The present disclosure refers to food products, and more specifically baked food products. For convenience, this disclosure refers to general baked food products generally as biscuits. Thus, it should be understood that such general references to biscuits are not intended to exclusively apply to biscuits alone. That is, the references to biscuits in the present are intended to refer to any baked food products capable of being manufactured in the described production processes, including but not limited to cookies, crackers, muffins, cakes, bread products, wafers, or the like.

The present disclosure describes preferred embodiments and examples of the present technology. It is contemplated that certain aspects described herein with respect to specific embodiments could be included in other embodiments even if not specifically described with respect to those embodiments. Those skilled in the art will recognize that a wide variety of modifications, alterations, and combinations can be made with respect to the above described embodiments without departing from the scope of the invention as set forth in the claims, and that such modifications, alterations, and combinations are to be viewed as being within the ambit of the inventive concept. All references cited in the present disclosure are hereby incorporated by reference in their entirety.

The invention claimed is:

1. A method of packaging food products comprising:
   forming an array of individual stacks of food products;
   advancing the array of individual stacks of food products in a downstream direction to a bucket conveyor with an array of buckets shaped to hold stacks of the food products;
   identifying, via a control module, one of the individual stacks of food products for transfer from the bucket conveyor to one of a plurality of packaging machines;
   providing a plurality of transfer devices each associated with at least one of the plurality of packaging machines;
   lifting, from the buckets of the bucket conveyor, via one of the transfer devices controlled and selectively activated by the control module, the one of the individual stacks of food products identified by the control module from the array;
   transferring from the array the identified one of the individual stacks of food products lifted from the buckets of the bucket conveyor by the transfer device selected by the control module to the one of a plurality of packaging machines; and
   packaging, via the one of the plurality of the packaging machines, at least part of the identified one of the individual stacks of food products transferred from the buckets of the bucket conveyor by the transfer device.

2. The method of claim 1, further comprising determining, via the control module, which of the individual stacks of food products in the array are suitable for packaging and which of the individual stacks of food products in the array are not suitable for packaging, and controlling the transfer device to bypass individual stacks of food products determined by the control module to be unsuitable for packaging.

3. The method of claim 1, wherein the transfer device is a robotic arm.

4. The method of claim 1, wherein the food products have a side and an edge, the method further comprising moving the food products from their side to their edge such that the food products are on their edges in the stacks.

5. The method of claim 1, further comprising:
   identifying a second of the individual stacks of food products for transfer to a second packaging machine, the second of the individual stacks of food products having been spaced from the identified one of the individual stacks of food products by at least one intermediate stack of food products;
   transferring the second of the individual stacks of food products from the array to the second packaging machine; and
   packaging at least part of the second of the individual stacks of food products with the second packaging machine.

6. A method of packaging food products comprising:
sequentially forming an array of individual stacks of the food products on a bucket conveyor having an array of buckets shaped to hold stacks of the food products;
identifying, via a control module, one of the individual stacks of the food products on the bucket conveyor for removing from the array on the bucket conveyor;
elevating, from the buckets of the bucket conveyor, via a transfer device controlled and selectively activated by the control module, the one of the individual stacks of the food products identified by the control module for removal from the array on the bucket conveyor;
sequentially depositing a plurality of the food products from the one of the individual stacks of food products lifted from the array on the bucket conveyor via the transfer device selected by the control module onto a wrapper; and
enclosing the plurality of food products sequentially elevated from the buckets of the bucket conveyor and deposited by the transfer device selectively activated by the control module onto the wrapper within the wrapper.

7. The method of claim 6, wherein the step of sequentially forming the array comprises forming each of the individual stacks in a bucket of a bucket conveyor.

8. The method of claim 7, wherein the transfer device includes a robotic arm, and further comprising using the robotic arm to remove the one of the stacks of food products and to elevated the one of the stacks of food products.

* * * * *